(12) United States Patent
Kilcrease

(10) Patent No.: US 10,023,261 B2
(45) Date of Patent: Jul. 17, 2018

(54) MOTORCYCLE TRAILER

(71) Applicant: Richard Kilcrease, Wimberley, TX (US)

(72) Inventor: Richard Kilcrease, Wimberley, TX (US)

(*) Notice: Subject to any disclaimer, the term of this patent is extended or adjusted under 35 U.S.C. 154(b) by 0 days.

(21) Appl. No.: 14/991,721

(22) Filed: Jan. 8, 2016

(65) Prior Publication Data
US 2017/0197683 A1 Jul. 13, 2017

(51) Int. Cl.
| | |
|---|---|
| *B62K 27/02* | (2006.01) |
| *B62K 27/00* | (2006.01) |
| *B62K 27/04* | (2006.01) |
| *B62K 27/12* | (2006.01) |

(52) U.S. Cl.
CPC ............ *B62K 27/003* (2013.01); *B62K 27/02* (2013.01); *B62K 27/04* (2013.01); *B62K 27/12* (2013.01); *B62K 2710/04* (2013.01); *B62K 2710/16* (2013.01)

(58) Field of Classification Search
CPC .. B62K 27/003; B62K 27/12; B62K 2710/16; B60D 1/50
See application file for complete search history.

(56) References Cited

U.S. PATENT DOCUMENTS

| | | | | |
|---|---|---|---|---|
| 3,823,975 A | * | 7/1974 | Cooper | B60P 3/341 296/173 |
| 4,014,586 A | * | 3/1977 | Swofford | B60P 3/341 296/169 |
| 4,536,001 A | * | 8/1985 | Wagner | B62D 63/064 280/204 |
| 4,537,441 A | * | 8/1985 | McCleary | B60P 3/32 220/4.21 |
| 4,566,717 A | * | 1/1986 | Arthur | B60G 15/06 267/221 |
| D313,955 S | * | 1/1991 | van der Merwe | D12/102 |
| 5,308,096 A | * | 5/1994 | Smith | B62K 27/02 224/415 |
| D378,583 S | * | 3/1997 | Aitken, III | D12/102 |
| D391,525 S | * | 3/1998 | Savitski | D12/102 |
| D395,261 S | * | 6/1998 | Puhl | D12/102 |
| 5,984,342 A | * | 11/1999 | Ysker | B62K 27/006 280/475 |

(Continued)

*Primary Examiner* — Anne Marie M Boehler
*Assistant Examiner* — Michael R Stabley
(74) *Attorney, Agent, or Firm* — Derek R. Van Gilder

(57) ABSTRACT

A motorcycle trailer that includes a box trailer bed. The motorcycle trailer also includes a hinged lift lid, the lift lid including aerodynamic curvature on the front top and rear top. The motorcycle trailer additionally includes at least one lid latch positioned and structured on the off-road side of the hinged lift lid for fastening and unfastening the hinged lift lid closed selectively and the hinged lift lid having lid curvature corresponding to the aerodynamic curvature of the front top and the aerodynamic curvature of the rear top of the box trailer bed. The motorcycle trailer also includes the box trailer bed being affixed to a trailer frame, a road-side wheel suspended from the roadway side of the trailer frame with a road-side spring member and an off-road-side wheel suspended from the off-road side of the trailer frame with an off-road-side spring member.

20 Claims, 5 Drawing Sheets

(56) References Cited

U.S. PATENT DOCUMENTS

| | | | | |
|---|---|---|---|---|
| 6,398,290 B1* | 6/2002 | Williams | ............... | B60P 3/07 |
| | | | | 224/509 |
| 6,409,194 B1* | 6/2002 | Voas | ............... | B62K 27/003 |
| | | | | 280/204 |
| D464,916 S * | 10/2002 | Golenz | ............... | D12/102 |
| 6,575,523 B2* | 6/2003 | Votruba | ............... | B62D 63/064 |
| | | | | 296/182.1 |
| D507,208 S * | 7/2005 | Ulch | ............... | D12/102 |
| 6,994,393 B2* | 2/2006 | Votruba | ............... | B62D 63/064 |
| | | | | 16/366 |
| 7,121,575 B2* | 10/2006 | Finch | ............... | B62K 27/04 |
| | | | | 280/202 |
| 7,144,070 B2* | 12/2006 | Wiebe | ............... | B60R 9/055 |
| | | | | 296/183.1 |
| 7,552,933 B1* | 6/2009 | Beckman | ............... | B62K 27/003 |
| | | | | 280/202 |
| 7,654,609 B1* | 2/2010 | McNutt | ............... | B60P 3/07 |
| | | | | 280/789 |
| 7,717,453 B2* | 5/2010 | Myers | ............... | B60D 1/155 |
| | | | | 280/415.1 |
| 7,726,680 B2* | 6/2010 | Lane | ............... | B60P 3/1083 |
| | | | | 280/482 |
| 7,810,866 B2* | 10/2010 | Dempsey | ............... | B60P 3/341 |
| | | | | 296/169 |
| 7,850,184 B1* | 12/2010 | Beckman, Sr. | ............... | B62K 27/003 |
| | | | | 280/202 |
| 8,196,988 B1* | 6/2012 | Malleck | ............... | B60P 3/341 |
| | | | | 224/400 |
| 8,863,867 B1* | 10/2014 | Haworth | ............... | B62D 63/065 |
| | | | | 180/19.1 |
| 2008/0150317 A1* | 6/2008 | Kilcrease | ............... | B62D 63/062 |
| | | | | 296/100.06 |

* cited by examiner

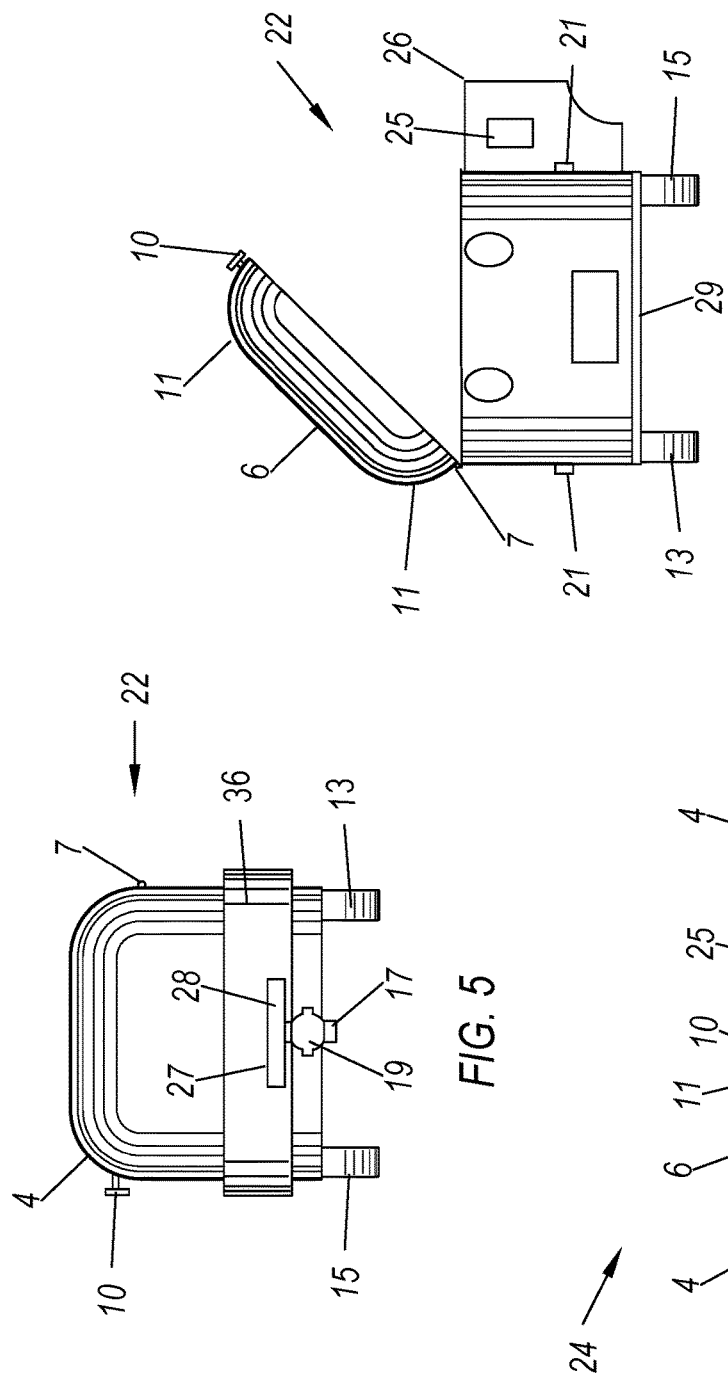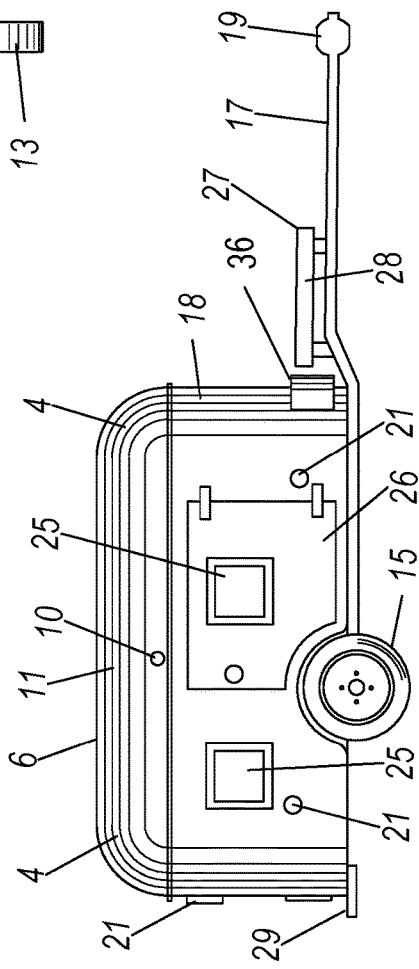

MOTORCYCLE TRAILER

CROSS-REFERENCE TO RELATED APPLICATIONS

Not applicable.

BACKGROUND OF THE INVENTION

There are known motorcycle trailers, but none with a hinged lift lid intermediate aerodynamic curvature of a front and a rear top of a box bed having correspondingly aerodynamic curvature of corners and with the lift lid having correspondingly aerodynamic curvature of lid sides in a manner taught by this invention. The hinged lift lid is hinged on a roadway side of the box bed for being lifted from an off-road side of the box bed.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a motorcycle trailer. The motorcycle trailer includes a box trailer bed having four arcuate corners, a front top having aerodynamic curvature corresponding to aerodynamic curvature of front arcuate corners and a rear top having aerodynamic curvature corresponding to aerodynamic curvature of rear aerodynamic corners. The motorcycle trailer also includes a hinged lift lid, the lift lid including aerodynamic curvature on the front top and rear top. The motorcycle trailer further includes the hinged lift lid being hinged with at least one lid hinge to a roadway side of a top of a side wall of the box trailer bed for opening the hinged lift lid upwardly from an off-road side of the box trailer bed. The motorcycle trailer additionally includes at least one lid latch positioned and structured on the off-road side of the hinged lift lid for fastening and unfastening the hinged lift lid closed selectively and the hinged lift lid having lid curvature corresponding to the aerodynamic curvature of the front top and the aerodynamic curvature of the rear top of the box trailer bed. The motorcycle trailer also includes the box trailer bed being affixed to a trailer frame, a road-side wheel suspended from the roadway side of the trailer frame with a road-side spring member and an off-road-side wheel suspended from the off-road side of the trailer frame with an off-road-side spring member. The motorcycle trailer further includes a trailer tongue extended from a frame front of the trailer frame and a rod end bearing on a front of the trailer tongue. The motorcycle trailer additionally includes a trailer floor on the trailer frame and at least legally required trailer lights operable from a towing vehicle.

Another example embodiment includes a motorcycle trailer. The motorcycle trailer includes a box trailer bed having four arcuate corners, a front top having aerodynamic curvature corresponding to aerodynamic curvature of front arcuate corners and a rear top having aerodynamic curvature corresponding to aerodynamic curvature of rear aerodynamic corners. The motorcycle trailer also includes a hinged lift lid, the lift lid including aerodynamic curvature on the front top and rear top. The motorcycle trailer further includes the hinged lift lid being hinged with at least one lid hinge to a roadway side of a top of a side wall of the box trailer bed for opening the hinged lift lid upwardly from an off-road side of the box trailer bed. The motorcycle trailer additionally includes the box trailer bed is a cargo bed having side walls extended vertically upward a distance between two feet and four feet from the trailer frame. The cargo bed having a length between 4 feet and 6 feet and a width between 3 feet and 6 feet. The motorcycle trailer additionally includes at least one lid latch positioned and structured on the off-road side of the hinged lift lid for fastening and unfastening the hinged lift lid closed selectively and the hinged lift lid having lid curvature corresponding to the aerodynamic curvature of the front top and the aerodynamic curvature of the rear top of the box trailer bed. The motorcycle trailer also includes the box trailer bed being affixed to a trailer frame, a road-side wheel suspended from the roadway side of the trailer frame with a road-side spring member and an off-road-side wheel suspended from the off-road side of the trailer frame with an off-road-side spring member. The motorcycle trailer further includes a trailer tongue extended from a frame front of the trailer frame, where the trailer tongue includes one or more rubber mounts, and a ¾-inch rod end bearing on a front of the trailer tongue. The motorcycle trailer additionally includes a trailer floor on the trailer frame and at least legally required trailer lights operable from a towing vehicle. The motorcycle trailer moreover includes a detachable cooler rack positioned on the trailer tongue, the detachable cooler rack having predetermined side restrictions for holding coolers and other select cargo.

Another example embodiment includes a motorcycle trailer. The motorcycle trailer includes a box trailer bed having four arcuate corners, a front top having aerodynamic curvature corresponding to aerodynamic curvature of front arcuate corners and a rear top having aerodynamic curvature corresponding to aerodynamic curvature of rear aerodynamic corners. The motorcycle trailer also includes a hinged lift lid, the lift lid including aerodynamic curvature on the front top and rear top. The motorcycle trailer additionally includes the box trailer bed is a sleeper bed having side walls extended vertically upward a distance between two feet and four feet from the trailer frame. The sleeper bed having a length between 6 feet and 8 feet, a width between 3 feet and 6 feet and an entrance door on at least the off-road side of the sleeper bed. The motorcycle trailer further includes the hinged lift lid being hinged with at least one lid hinge to a roadway side of a top of a side wall of the box trailer bed for opening the hinged lift lid upwardly from an off-road side of the box trailer bed. The motorcycle trailer additionally includes the box trailer bed is a cargo bed having side walls extended vertically upward a distance between two feet and four feet from the trailer frame. The cargo bed having a length between 4 feet and 6 feet and a width between 3 feet and 6 feet. The motorcycle trailer additionally includes at least one lid latch positioned and structured on the off-road side of the hinged lift lid for fastening and unfastening the hinged lift lid closed selectively and the hinged lift lid having lid curvature corresponding to the aerodynamic curvature of the front top and the aerodynamic curvature of the rear top of the box trailer bed. The motorcycle trailer also includes the box trailer bed being affixed to a trailer frame, a road-side wheel suspended from the roadway side of the trailer frame with a road-side spring member and an off-road-side wheel suspended from the off-road side of the trailer frame with an off-road-side spring member. The motorcycle trailer further includes a trailer tongue extended from a frame front of the trailer frame, where the trailer tongue includes one or more rubber mounts, and a ¾-inch rod end bearing on a front of the trailer tongue. The motorcycle trailer additionally includes a trailer floor on the trailer frame and at least legally required trailer lights operable from a towing vehicle. The motorcycle trailer moreover includes a detachable cooler rack positioned on the trailer tongue, the detachable cooler rack having predetermined side restrictions for holding coolers and other select cargo.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 5 is a front view of the FIG. 1 embodiment;

FIG. 6 is a rear view of an embodiment with a sleeper bed showing a hinged lift lid opened upwardly and an entrance door on an off-road side opened;

FIG. 7 is a side view of the embodiment with the sleeper bed with the hinged lift lid and the entrance door being shut;

DETAILED DESCRIPTION OF SOME EXAMPLE EMBODIMENTS

Figure 1:
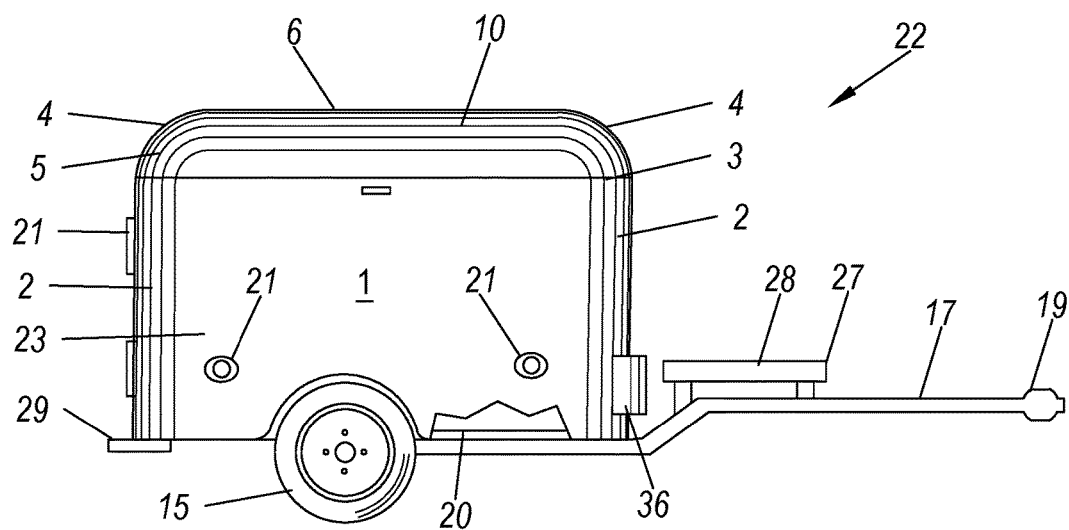
FIG. 1 is a partially cutaway side elevation view of an embodiment with a cargo bed.
Figure 2:
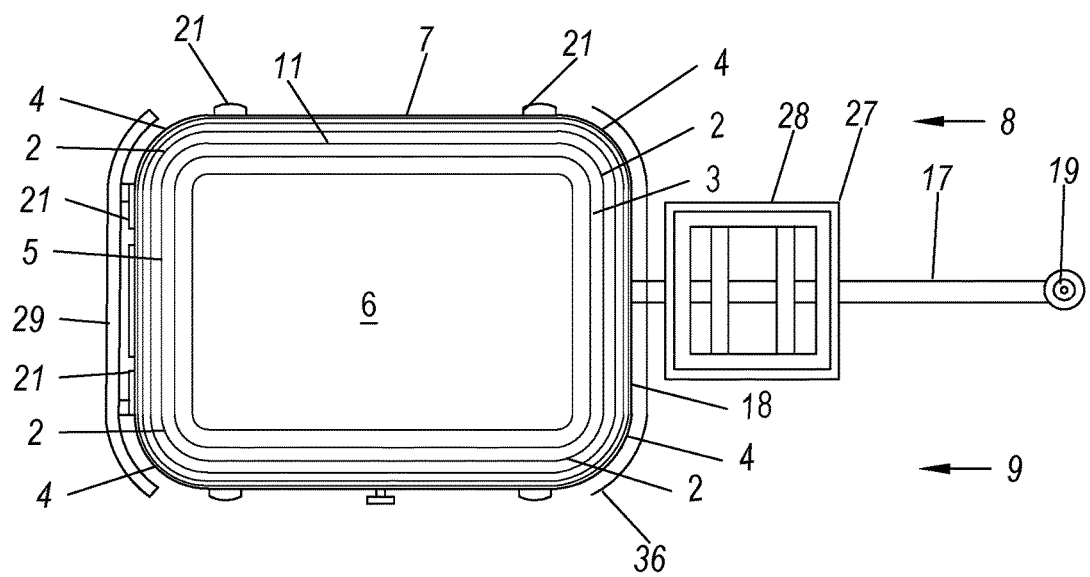
FIG. 2 is a top view of the FIG. 1 embodiment.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Referring to FIGS. 1-2, 5-7 and 9-10, the motorcycle trailer has a box trailer bed 1 with four arcuate corners 2. The box trailer bed 1 has a hinged lift lid 6 that opens upwardly on at least one lid hinge 7. The hinged lift lid 6 includes a front top 3 having aerodynamic curvature 4 corresponding to aerodynamic curvature 4 of front arcuate corners and a rear top 5 having aerodynamic curvature 4 corresponding to aerodynamic curvature 4 of rear aerodynamic corners. A gas pressurized lifting shocks 41 shown in FIGS. 9-10 can be attached to the hinged lift lid 6 and a top of a roadway side 9 of a side wall 23 for assisting in lifting and holding the hinged lift lid 6 open. A lid latch 10 is positioned on an off-road side 9 of the box trailer bed 1 hinged lift lid 6 for fastening and unfastening the hinged lift lid 6 selectively from the off-road side 9 of the box trailer bed 1. A selection of known latches can be employed. Some can be positioned on the hinged lift lid 6 for grasping it. Others can be positioned on a top of an off-road side wall 23 for allowing the gas pressurized lifting shocks 41 to open the hinged lift lid 6.

A roadway side 8 of the box trailer bed 1 is a side adjacent to a road with the motorcycle trailer parked on a side of the road and facing in a direction of traffic travel in an adjacent traffic lane of the road. An off-road side 9 of the box trailer bed 1 is an opposite side for access to the hinged lift lid 6 on an opposite side from traffic travel on the road.

The hinged lift lid 6 has lid curvature 11 corresponding to the aerodynamic curvature 4 of the front top 3 and the aerodynamic curvature of the rear top 6 of the box trailer bed 1. Top corners of the box trailer bed 1 have curvature to match side corners.

The box trailer bed 1 is affixed to a trailer frame 12 that can be made of metal rods that preferably are welded together and heat-treated for normalizing and heat-strengthening weldments and the metal rods. Suitable heat treatment of welded frame structure can maximize strength per weight of the trailer frame 12.

Figure 3:
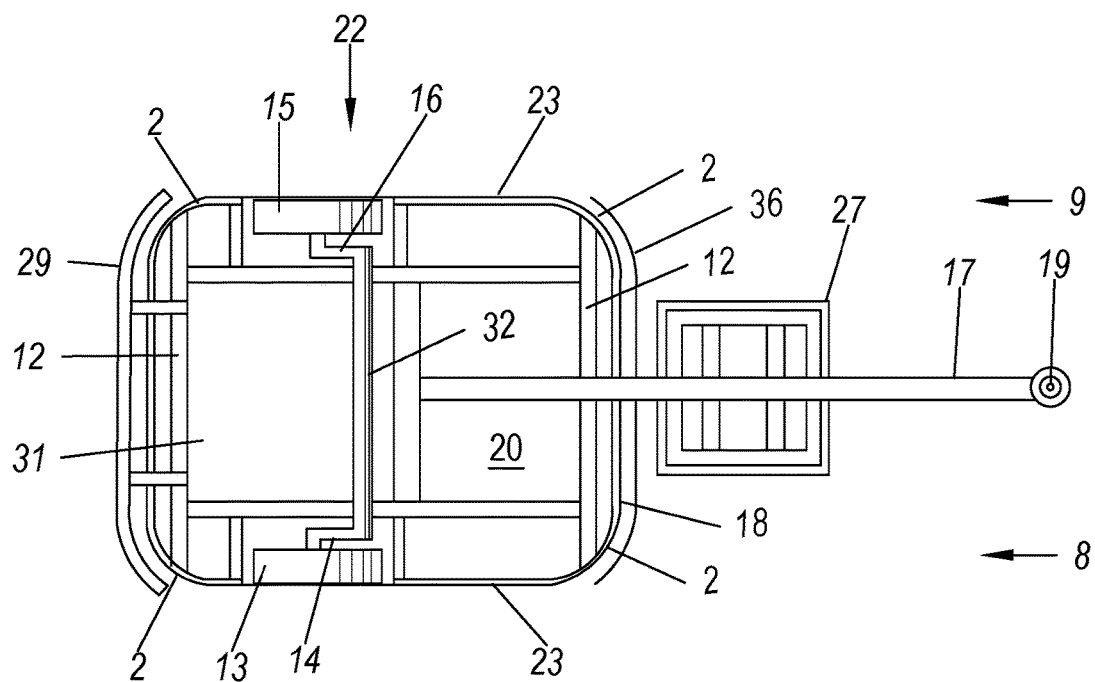
FIG. 3 is a bottom view of the FIG. 1 embodiment with a torsion spring system.
Figure 4:
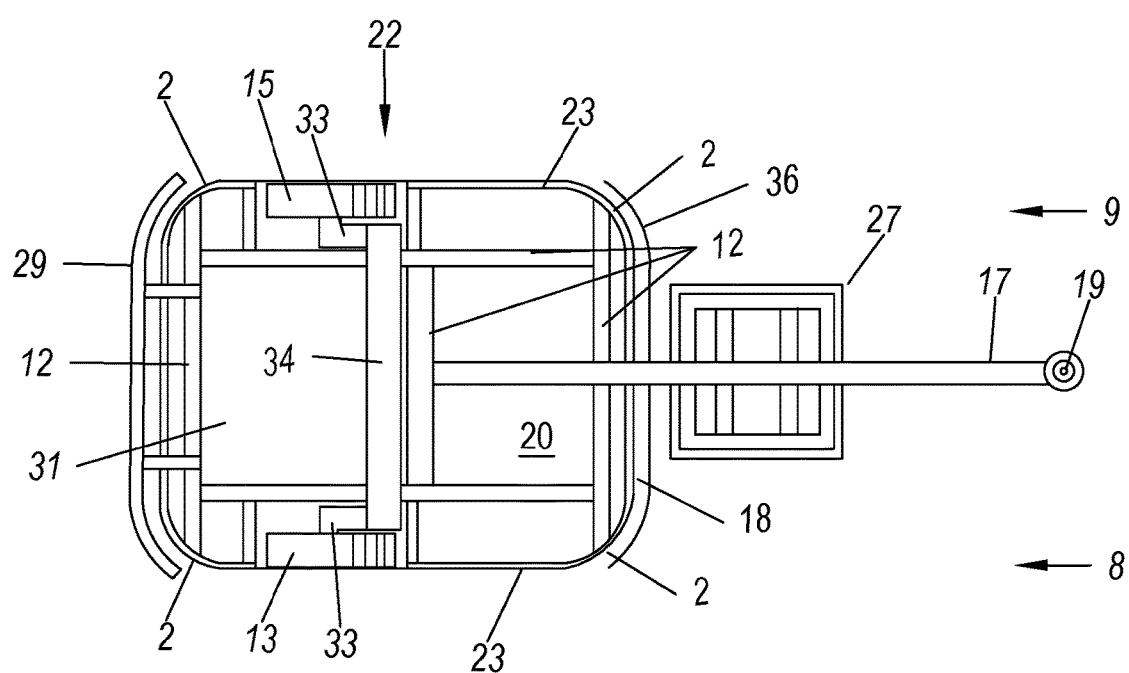
FIG. 4 is a bottom view of the FIG. 1 embodiment with an independent leaf-spring system.

Referring to FIGS. 3-4, a road-side wheel 13 is suspended from the roadway side 8 of the trailer frame 12 with a road-side spring member 14. An off-road-side wheel 15 is suspended from the off-road side 9 of the trailer frame 12 with an off-road-side spring member 16. A selection of known spring systems can be utilized. FIG. 3 shows a torsion-spring system with the road-side spring member 14 and the off-road-side spring member 16 suspended from a torsion rod 32. FIG. 4 shows a leaf-spring system with leaf-spring members 33 suspended from a rectangular rod 34. Optionally, but not preferably, the wheels can be suspended without springs.

Referring to FIGS. 1-4, 7 and 11, a trailer tongue 17 is extended from a body front 18 of the trailer frame 12. The trailer tongue 17 is mounted with rubber mounts 35 to stop the harmonics created by the road and operating motorcycle. The rubber mounts 35 stop the metal fatigue at the attachment points and stops trailer tongue 17 failures. The rubber mounts 35 also smooth the feel of the trailer when in motion. A rod end bearing 19 is positioned on a front of the trailer tongue 17. A rod end bearing 19 (also known as a heim joint or rose joint), is a mechanical articulating joint. A ball swivel with an opening through which a bolt or other attaching hardware may pass is pressed into a circular casing with a shaft attached. The ball swivel can be ¾ inch or any other desired size to match the size of the ball joint on the motorcycle.

Referring to FIG. 1, a trailer floor 20 is positioned on the trailer frame 12. A selection of known floor systems can be employed. One floor system that is strong, light and durable for floor-impact conditions is plastic reinforced with woven jute. It is also good insulation for the sleeper bed 24.

Referring to FIGS. 1-2 and 5-7, at least legally required trailer lights 21 operable from a towing vehicle are positioned on the box trailer bed 1. The trailer lights 21 can include side lights and rear lights. The rear lights are preferably large and turn-signal operable from a towing vehicle. A road shield 36 is also placed in front of the box trailer bed 1 on the trailer tongue 17. The road shield 36 includes a metal strap attached to the trailer tongue 17 with a clear plastic shield (e.g., it can be clear polycarbonate) attached to the metal strap. The road shield 36 matches the shape of the box trailer bed 1 (including arcuate corners 2).

Referring to FIGS. 1-4 and 7, a detachable cooler rack 27 can be positioned on the trailer tongue 17. The detachable cooler rack 27 can be removed from the trailer tongue 17 and placed inside the cargo bed 22. A preferred detachable cooler rack 27 has short side restrictions 28 and light structure for holding coolers and other select cargo. The detachable cooler rack 27 can be structured to carry light kitchen facilities, food, beverages and other items for travel use without accessing either the cargo bed 22 or the sleeper bed 24. The detachable cooler rack 27 separates sleeping quarters of the sleeper bed 24 from food and outdoor light kitchen facilities.

Referring to FIGS. 1-4 and 5, the box trailer bed 1 includes the cargo bed 22 having side walls 23 extended vertically upward a distance between two feet and four feet from the trailer frame 12. The cargo bed 22 has a length of four-to-six feet and a width of three-to-six feet.

Referring to FIGS. 6-7, the box trailer bed 1 includes a sleeper bed 24 having side walls 23 extended vertically upward a distance between two feet and four feet from the trailer frame 12. The sleeper bed 24 has a length of six-to-eight feet and a width of three-to-six feet.

Referring further to FIGS. 6-7, the sleeper bed 24 can have at least one side window 25 preferably being tinted and ventable on at least one end of the sleeper bed 24. The sleeper bed 24 also has an entrance door 26 on at least the off-road side 9 of the sleeper bed 24.

Referring to FIGS. 1-7, the box trailer bed 1 and the hinged lift lid 6 can be made of a selection of materials. Included can be cut and shaped aluminum sheet metal and reinforced plastic. Woven jute of a suitable weight and grade has particularly high impact and tensile strengths with high durability for trailer use conditions. It has higher impact strength that glass fibers and provides more insulated comfort than either aluminum or fiberglass.

Referring to FIGS. 1-4 and 6-7, a rear bumper 29 can be attached to the trailer frame 12.

Figure 8:
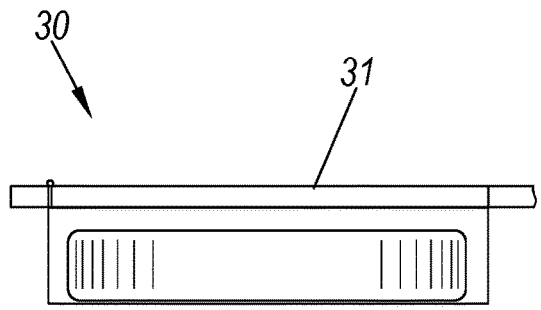
FIG. 8 is an enlarged fragmentary view of a spare-wheel attachment under an aft bottom of the motorcycle trailer.
Figure 9:
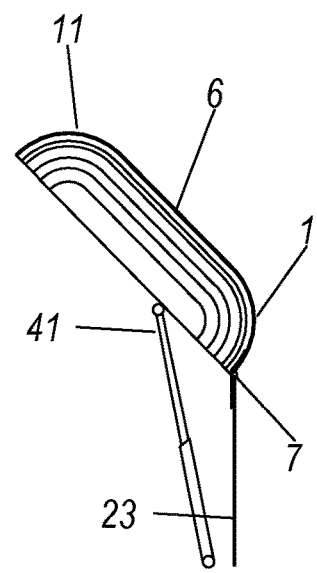
FIG. 9 is a partially cutaway side view of the box trailer bed with the hinged lift lid lifted to an open angle.
Figure 10:
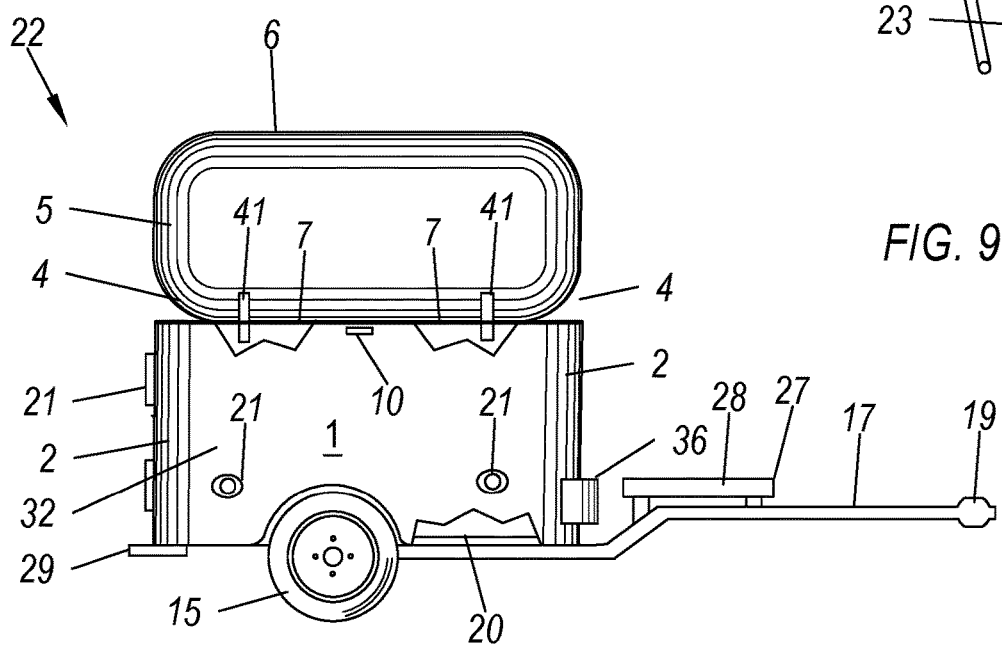
FIG. 10 is a fragmentary side view of the hinged lift lid opened on top of a sidewall.
Figure 11:
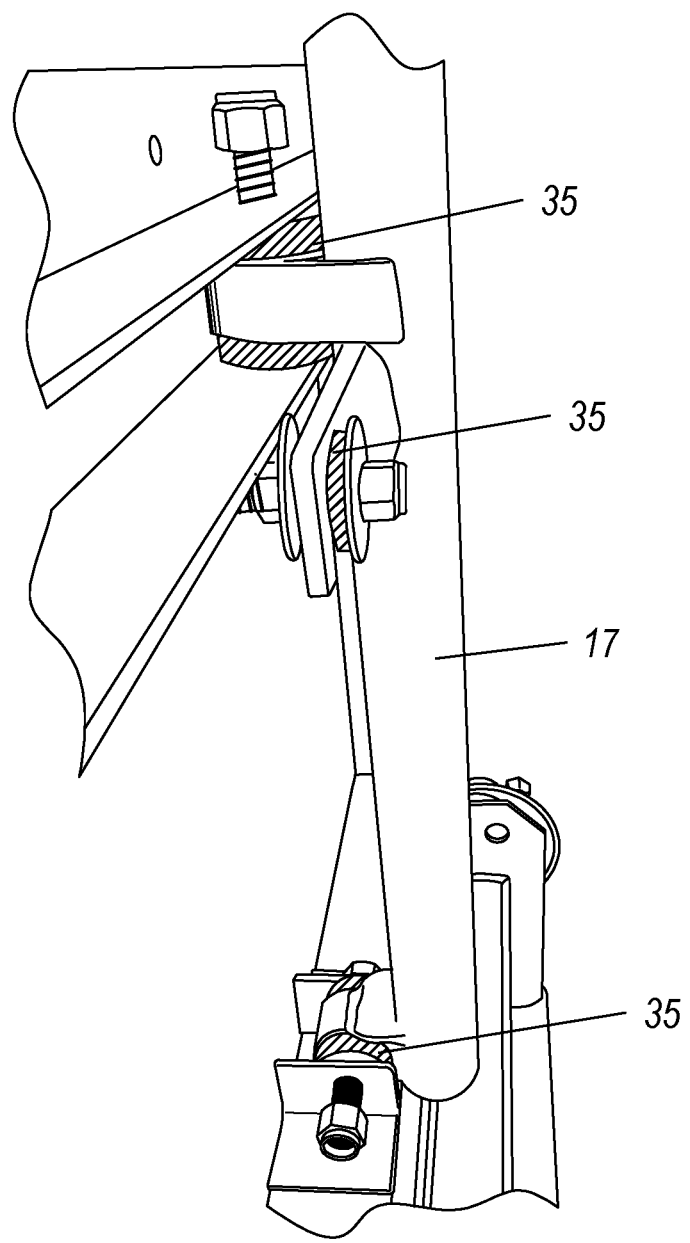
FIG. 11 is a side view of the trailer tongue.

Referring to FIGS. 3-4 and 8, a spare-wheel compartment 30 can be located in the cargo bed 22. The spare-wheel compartment 30 has a cover 31 or lid which separates the spare-wheel compartment 30 from the cargo in the cargo bed 22. Other items such as a tire wrench, tools, tire pump, etc. can be stored within the spare-wheel compartment 30.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A motorcycle trailer comprising:
   a box trailer bed having four arcuate corners, a front top having aerodynamic curvature corresponding to aerodynamic curvature of front arcuate corners and a rear top having aerodynamic curvature corresponding to aerodynamic curvature of rear aerodynamic corners;
   a hinged lift lid including:
      aerodynamic curvature on the front top; and
      aerodynamic curvature on the rear top;
   the hinged lift lid being hinged with at least one lid hinge to a roadway side of a top of a side wall of the box trailer bed for opening the hinged lift lid upwardly from an off-road side of the box trailer bed;
   at least one lid latch positioned and structured on the off-road side of the hinged lift lid for fastening and unfastening the hinged lift lid closed selectively;
   the hinged lift lid having lid curvature corresponding to the aerodynamic curvature of the front top and the aerodynamic curvature of the rear top of the box trailer bed;
   the box trailer bed being affixed to a trailer frame;
   a road-side wheel suspended from the roadway side of the trailer frame with a road-side spring member;
   an off-road-side wheel suspended from the off-road side of the trailer frame with an off-road-side spring member;
   wherein the road-side spring member and the off-road-side spring member each include at least one of:
      a leaf spring; or
      a torsion spring;
   a trailer tongue, wherein the trailer tongue:
      extends from a frame front of the trailer frame;
      is attached to the trailer frame at one or more attachment points; and
      includes one or more rubber mounts, wherein the one or more rubber mounts prevent direct contact between the trailer tongue and the trailer frame at the one or more attachment points;
   a rod end bearing on a front of the trailer tongue;
   a trailer floor on the trailer frame; and
   trailer lights operable from a towing vehicle.

2. The motorcycle trailer of claim 1 and further comprising:
   a detachable cooler rack positioned on the trailer tongue; and
   the detachable cooler rack having predetermined side restrictions for holding coolers and other select cargo.

3. The motorcycle trailer of claim 1 in which:
   the box trailer bed is a cargo bed having side walls extended vertically upward a distance between two feet and four feet from the trailer frame;
   the cargo bed having a length between 4 feet and 6 feet; and
   the cargo bed having a width between 3 feet and 6 feet.

4. The motorcycle trailer of claim 1 in which:
   the box trailer bed is a sleeper bed having side walls extended vertically upward a distance between two feet and four feet from the trailer frame;
   the sleeper bed having a length between 6 feet and 8 feet; and
   the sleeper bed having a width between 3 feet and 6 feet.

5. The motorcycle trailer of claim 4 and further comprising:
   at least one side window being tinted and ventable on at least one side of the sleeper bed.

6. The motorcycle trailer of claim 4 and further comprising:
   an entrance door on at least the off-road side of the sleeper bed.

7. The motorcycle trailer of claim 4 and further comprising:
   a detachable cooler rack positioned on the trailer tongue; and
   the detachable cooler rack having predetermined side restrictions for holding coolers and other select cargo.

8. The motorcycle trailer of claim 4 and further comprising:

the box trailer bed and the hinged lift lid are made of cut and shaped aluminum sheet metal.

9. The motorcycle trailer of claim 4 and further comprising:
the box trailer bed and the hinged lift lid are made of reinforced plastic.

10. The motorcycle trailer of claim 4 and further comprising:
a rear bumper attached to the trailer frame.

11. The motorcycle trailer of claim 1 in which:
the box trailer bed and the hinged lift lid are made of cut and shaped aluminum sheet metal.

12. The motorcycle trailer of claim 1 in which:
the box trailer bed and the hinged lift lid are made of reinforced plastic.

13. The motorcycle trailer of claim 1 and further comprising:
a rear bumper attached to the trailer frame.

14. The motorcycle trailer of claim 1 and further comprising:
a spare-wheel compartment located within the box trailer.

15. A motorcycle trailer comprising:
a box trailer bed having four arcuate corners, a front top having aerodynamic curvature corresponding to aerodynamic curvature of front arcuate corners and a rear top having aerodynamic curvature corresponding to aerodynamic curvature of rear aerodynamic corners;
a hinged lift lid including:
aerodynamic curvature on the front top; and
aerodynamic curvature on the rear top;
the hinged lift lid being hinged with at least one lid hinge to a roadway side of a top of a side wall of the cargo bed for opening the hinged lift lid upwardly from an off-road side of the cargo bed;
the box trailer bed is a cargo bed having side walls extended vertically upward a distance between two feet and four feet from the trailer frame;
the cargo bed having a length between 4 feet and 6 feet;
the cargo bed having a width between 3 feet and 6 feet;
at least one lid latch positioned and structured on the off-road side of the cargo bed for fastening and unfastening the hinged lift lid closed selectively;
the hinged lift lid having lid curvature corresponding to the aerodynamic curvature of the front top and the aerodynamic curvature of the rear top of the box trailer bed;
the box trailer bed being affixed to a trailer frame;
a road-side wheel suspended from the roadway side of the trailer frame;
an off-road-side wheel suspended from the off-road side of the trailer frame;
a trailer tongue, wherein the trailer tongue:
extends from a frame front of the trailer frame
is attached to the trailer frame at one or more attachment points; and
includes one or more rubber mounts, wherein the one or more rubber mounts prevent direct contact between the trailer tongue and the trailer frame at the one or more attachment points;
a ¾-inch rod end bearing on a front of the trailer tongue;
a trailer floor on the trailer frame;
a road shield, the road shield:
placed in front of the box trailer bed on the trailer tongue;
includes:
a metal strap attached to the trailer tongue; and
a clear plastic shield attached to the metal strap;
trailer lights operable from a towing vehicle; and
a detachable cooler rack positioned on the trailer tongue, the detachable cooler rack having predetermined side restrictions for holding coolers and other select cargo.

16. The system of claim 15 in which:
the box trailer bed and the hinged lift lid are made of cut and shaped aluminum sheet metal.

17. The system of claim 15 in which:
the box trailer bed and the hinged lift lid are made of reinforced plastic.

18. A motorcycle trailer comprising:
a box trailer bed having four arcuate corners, a front top having aerodynamic curvature corresponding to aerodynamic curvature of front arcuate corners and a rear top having aerodynamic curvature corresponding to aerodynamic curvature of rear aerodynamic corners;
a hinged lift lid including:
aerodynamic curvature on the front top; and
aerodynamic curvature on the rear top;
the box trailer bed is a sleeper bed having side walls extended vertically upward a distance between two feet and four feet from the trailer frame;
the sleeper bed having a length between 6 feet and 8 feet;
the sleeper bed having a width between 3 feet and 6 feet;
an entrance door on at least the off-road side of the sleeper bed;
the hinged lift lid being hinged with at least one lid hinge to a roadway side of a top of a side wall of the sleeper bed for opening the hinged lift lid upwardly from an off-road side of the sleeper bed;
at least one lid latch positioned and structured on the off-road side of the sleeper bed for fastening and unfastening the hinged lift lid closed selectively;
the hinged lift lid having lid curvature corresponding to the aerodynamic curvature of the front top and the aerodynamic curvature of the rear top of the box trailer bed;
the box trailer bed being affixed to a trailer frame;
a road-side wheel suspended from the roadway side of a trailer frame;
an off-road-side wheel suspended from an off-road side of the trailer frame;
a trailer tongue, wherein the trailer tongue:
extends from a frame front of the trailer frame
is attached to the trailer frame at one or more attachment points; and
includes one or more rubber mounts, wherein the one or more rubber mounts prevent direct contact between the trailer tongue and the trailer frame at the one or more attachment points;
a ¾-inch rod end bearing on a front of the trailer tongue;
a trailer floor on the trailer frame;
a road shield, the road shield:
placed in front of the box trailer bed on the trailer tongue;
includes:
a metal strap attached to the trailer tongue; and
a clear plastic shield attached to the metal strap, wherein the shape of the clear plastic shield matches the shape of the box trailer bed include arcuate corners;
trailer lights operable from a towing vehicle; and
a detachable cooler rack positioned on the trailer tongue, the detachable cooler rack having predetermined side restrictions for holding coolers and other select cargo.

19. The motorcycle trailer of claim 18 in which:
the box trailer bed and the hinged lift lid are made of cut and shaped aluminum sheet metal.

20. The motorcycle trailer of claim 18 in which:
the box trailer bed and the hinged lift lid are made of reinforced plastic.

\* \* \* \* \*